United States Patent Office 3,644,482
Patented Feb. 22, 1972

3,644,482
(4-HYDROXY-5-ALKYLPHENYL) ALKANOIC ACID ESTERS OF POLYOLS
Martin Dexter, Briarcliff Manor, John D. Spivack, Spring Valley, and David H. Steinberg, Bronx, N.Y., assignors to Ciba-Geigy Corporation, Greenburgh, N.Y.
No Drawing. Continuation-in-part of application Ser. No. 359,460, Apr. 13, 1964, which is a continuation-in-part of application Ser. No. 276,192, Apr. 29, 1963, which is a continuation-in-part of application Ser. No. 164,618, Jan. 5, 1962, which in turn is a continuation-in-part of application Ser. No. 148,738, Oct. 30, 1961. This application Sept. 26, 1969, Ser. No. 861,475
Int. Cl. C07c 69/76
U.S. Cl. 260—473 R
21 Claims

ABSTRACT OF THE DISCLOSURE

Esters derived from (4-hydroxy-5-alkylphenyl)-alkanoic acids, optionally substituted in the 2- or 3-position of the phenyl ring by a second alkyl group, and alkane polyols are stabilizers of organic material normally subject to oxidative deterioration. They are prepared by conventional esterification techniques. Typical embodiments are ethylene glycol bis[3 - (3,5-di-t-butyl-4-hydroxyphenyl) propionate] and pentaerythritol tetrakis[3-(3,5-di-t-butyl-4-hydroxyphenyl)propionate].

CROSS REFERENCE

This is a continuation-in-part of copending application Ser. No. 359,460, filed Apr. 13, 1964, now abandoned. Ser. No. 359,460 is a continuation-in-part of Ser. No. 276,192 filed Apr. 29, 1963, now abandoned, which is a continuation-in-part of Ser. No. 164,618 filed, Jan. 5, 1962, now abandoned, which is a continuation-in-part of Ser. No. 148,738, filed Oct. 30, 1961, now abandoned.

DETAILED DESCRIPTION

This invention pertains to compounds of the formula:

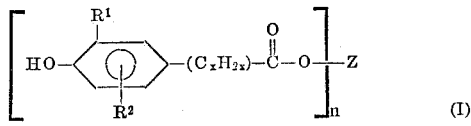

$$\left[ HO-\underset{R^2}{\underset{|}{\overset{R^1}{\overset{|}{\bigcirc}}}}-(C_xH_{2x})-\overset{O}{\overset{\|}{C}}-O \right]_n Z \quad (I)$$

wherein
$R^1$ is methyl, ethyl or an α-branched alkyl group of from 3 to 10 carbon atoms;
$R^2$ is hydrogen, methyl, ethyl or an α-branched alkyl group of from 3 to 10 carbon atoms;
$x$ has a value of from 1 to 6;
$n$ has a value of from 2 to 6;
$Z$ is an aliphatic hydrocarbon of the formula:

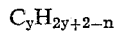

$$C_yH_{2y+2-n}$$

in which $y$ has a value of from 2 to 18 when $n$ is 2 and a value of from 3 to 6 when $n$ is greater than 2, the value of $y$ in all cases being equal to or greater than that of $n$.

It will be observed that the compounds of the present invention exhibit one alkyl group ($R^1$) in a position ortho to the hydroxy group. A second like or different alkyl group ($R^2$) is optionally present either (a) in the other position ortho to the hydroxy group (the 3-position) or (b) meta to the hydroxy group and para to the first alkyl group (the 2-position). These alkyl groups will be methyl, ethyl or when higher than ethyl, an α-branched alkyl group of from 3 to 10 carbon atoms. By the term "α-branched alkyl group" is intended one in which the carbon atom of the alkyl group which is bound to the phenyl group is also bound to at least two other carbon atoms of the alkyl group.

Thus the mono- or dialkylphenolic group includes for example 3,5-di-t-butyl-4-hydroxyphenyl,
3,5-dimethyl-4-hydroxyphenyl,
3,5-di-isopropyl-4-hydroxyphenyl,
2,5-dimethyl-4-hydroxyphenyl,
2-methyl-4-hydroxy-5-t-butylphenyl,
2-methyl-4-hydroxy-5-isopropylphenyl,
3-methyl-4-hydroxy-5-t-butylphenyl,
3,5-diethyl-4-hydroxyphenyl and the like. Preferred phenolic groups are those having at least one branched group such as isopropyl, t-butyl or the like in a position ortho to the hydroxy group.

The mono or dialkyl-4-hydrophenyl group is bound to an alkanoyl unit of from 2 to 7 carbon atoms. The hydrocarbon portion of this alkanoyl unit is represented by —$(C_xH_{2x})$— and may be of a straight or, when $x$ is greater than 1, branched chain. A preferred alkanoyl group is the 3-propionyl group.

Two or more (as determined by the integer $n$) of these mono- or dialkylphenylalkanoyl groups are then bound through a like number of oxygen atoms to the hydrocarbon residue of a polyol. The polyol from which these esters are derived will thus consist of the straight or branched chain hydrocarbon residue of the formula $C_yH_{2y+2-n}$ and a number of hydroxy groups equal to $n$. When $n$ is two, i.e., the polyol is a diol, this hydrocarbon residue will have from 2 to 18 carbon atoms. When $n$ is greater than two; i.e., the polyol is a triol, tetrol, pentol or hexol, the hydrocarbon residual will have from 3 to 6 carbon atoms. In all cases the number of hydroxy groups and the resulting number of alkylphenylalkanoyloxy groups (as designated by $n$) will be equal to or less than the number of carbon atoms ($y$) in the hydrocarbon residue; i.e., since each carbon atom of the hydrocarbon residue can bear only one hydroxy group, $y$ is equal to or greater than $n$.

These mono- and dialkylhydroxyphenylalkanoic acid esters of alkane polyols are stabilizers of organic material normally subject to oxidative deterioration as by light and/or heat. Materials which are thus stabilized include synthetic organic polymeric substances such as vinyl resins formed from the polymerization of vinyl halides or from the copolymerization of vinyl halides with unsaturated polymerizable compounds, e.g., vinyl esters, α,β-unsaturated ketones, α,β-unsaturated aldehydes and unsaturated hydrocarbons such as butadienes and styrene; poly-α-olefins such a spolyethylene, polypropylene, polybutylene, and the like, including copolymers of poly-α-olefins; polyisoprene; polychloroprene; polychlorohydrin; terpolymers of ethylene, propylene and a non-conjugated diene such as 1,4-hexadiene, ethylidenenorbornene, dicyclopentadiene or the like polybutadiene; polyurethanes such as are prepared from polyols and organic polyisocyanates; polyamides such as polyhexamethylene adipamide; polyesters such as polymethylene terephthalates; polycarbonates; polyacetals; polystyrene; polyethylenoxide; and copolymers such as those of high impact polystyrene containing copolymers of butadiene and styrene and those formed by the copolymerization of acrylonitrile, butadiene and/or styrene. Other materials stabilized according to the present invention include lubricating oil of the aliphatic ester type, e.g., di-(2-ethylhexyl)azelate, pentaerylthritol tetracaproate and the like; animal and vegetable derived oils, e.g., linseed oil, fat, tallow, lard, peanut oil, cod liver oil, castor oil, palm oil, corn oil, cotton seed oil and the like; hydrocarbon materials such as gasoline, both natural and synthetic, diesel oil, mineral oil, fuel oil, drying oil, cutting fluids, waxes, resins and the like, fatty acids such as soaps and the like.

In general the stabilizers of this invention are employed from about 0.005% to about 10% by weight of the stabilized composition, although this will vary with the particular substrate. An advantageous range is from about 0.05 to about 5%, especially 0.1% to about 1%. These compounds are particularly useful for the stabilization of polyolefins such as polypropylene and polyethylene. They can be blended before or after polymerization or sprayed on the surface of films, fabrics, filaments or the like to provide effective stabilization.

These compounds can also be used in combination with other additives such as antioxodants, sulfur-containing esters such as DSTDP, DLTDP and the like, pourpoint depressants, corrosion and rust inhibitors, dispersing agents, demulsifiers, antifoaming agents, carbon black, accelerators and other chemicals used in rubber compounding, plasticizers, color stabilizers, di- and trialkyl- and -alkylphenylphosphites, heat stabilizers, ultraviolet light stabilizers, dyes, pigments, metal chelating agents, dyesites and the like. Often combinations such as these, particularly the sulfur containing esters, the phosphites and/or the ultraviolet light stabilizers, will produce superior results in certain applications to those expected by the properties of the individual components. In addition, certain of the compounds of the present invention while demonstrating somewhat less antioxidant activity than other compounds of this invention, are nevertheless more attractive from the standpoint of economics of preparation. Often the antioxidant properties of such compounds can be dramatically enhanced by the use of a small amount of a compound such as DSTDP or DLTDP.

The compounds of the present invention can be prepared via conventional esterification procedures. These include treatment of a polyol of the formula:

with at least $n$ equivalents of an acid of the formula:

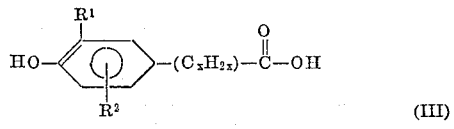

or an acid chloride or lower alkyl ester thereof. Direct esterification witth the acid is conducted in the presence of an acidic catalyst such as p-toluenesullfonic acid with removal of the water formed as through distillation.

When an acid chloride of the acid is utilized, the reaction is generally conducted in the presence of an acid binding agent such as pyridine which can also serve as the solvent. Cosolvents such as benzene or chloroform can also be added to improve solubility.

Use of a lower alkyl ester of an acid of Formula III, such as the methyl or ethyl ester, involves treatment of the polyol with up to a 15% excess, preferably from 5 to 10% excess, over the stoichiometric amount of the ester. This reaction is catalyzed with a hydride or lower alkoxide of an alkali metal, such as lithium hydride, lithium methoxide or sodium methoxide. These catalysts are employed in an amount from about 0.01 to about 0.30 molar equivalent per mole of polyol. The reaction is conducted at elevated temperatures and under reduced pressure and the lower alkanol which is formed being removed by distillation.

The products thus obtained by these methods are generally solids or thick liquids and can be purified when desired through conventional techniques such as crystallization chromatography, distillation or the like. For many applications the products need not be extensively purified.

The polyols of Formula II are well known and most are commercially available. Some are available as a mixture of isomers and can be used as such to yield a mixture of two or more esters of Formula I which need not be separated.

The acids and alkyl esters of Formula III are generally known and in any event can be readily synthesized from alkylated phenols. Acids of Formula III where $x$ is 1 can be prepared for example through chloromethylation of an alkylphenol (such as are described as starting materials in U.S. Pat. No. 2,838,571) followed by treatment with sodium or potassium cyanide and hydrolysis of the resultant alkylhydroxyphenylacetonitrile. The acids and esters of Formula III where $x$ is two or greater can be readily prepared by the methods of U.S. Pat. 3,247,240 through the Friedel-Crafts reaction utilizing alkyl phenol and an alkyl ester of chloroformylalkanoic acid followed by reduction of the alkyl substituted 4-hydroxybenzoylalkanoate (or the saponified free acid) as for example through a Clemmensen reduction or through reaction of an alkyl metal phenolate with a halo substituted alkanoate.

The acid chloride of the acids of Formula III are obtained through the use of thionyl chloride while the corresponding alkyl esters are obtained through conventional esterification techniques described above.

Typical of the various pathways for the preparation of these starting materials are the following procedures:

(A) Methyl 3 - (3,5-di-t-butyl-4-hydroxyphenyl)propionate.—To 500 parts by volume of dry t-butyl alcohol in a flask fitted with mechanical stirrer, inert gas inlet, thermometer, condenser and dropping funnel are added 2.1 parts of potassium metal. After the ensuing reaction is complete, there are added 37.3 parts of 2,6-di-t-butyl phenol, followed rapidly by 17.7 parts of methyl acrylate. The stirred reaction mixture is heated to 50° C. for 18 hours and allowed to cool. The solvent is removed under reduced pressure and the residual mass neutralized by addition of dilute hydrochloric acid. This mixture is then extracted with two portions of 200 parts by volume each of ethyl ether. The combined ethereal extracts are washed with two portions of 100 parts by volume each of water and then dried over anhydrous sodium sulfate. The ether layer is removed by filtration and concentrated on a steam bath. The residual oily mass is then vacuum distilled. The fraction collected at 125–130° C./0.1 mm. crystallizes upon standing to yield methyl 3-(3,5-di-t-butyl-4-hydroxyphenyl)propionate, M.P. 63.0–64.5° C. Recrystallization from hexane yields a white solid, M.P. 66–66.5° C.

Utilization of 2-methyl-6-t-butylphenol, 2,6-di-isopropylphenol, 2-t-butyl-5-methylphenol and 2-t-butylphenol in the above procedure yields methyl 3-(3-methyl-4-hydroxy-5-t-butylphenyl)propionate, B.P. 136–144° C./0.02 mm., methyl 3-(3,5-di-isopropyl-4-hydroxyphenyl)propionate, B.P. 130–132° C./0.4 mm., methyl 3-(2-methyl-4-hydroxy-5-t-butylphenyl)propionate, M.P. 75.5–77.5° C. and methyl 3 - (3-t-butyl-4-hydroxyphenyl)propionate, M.P. 146–147° C.

(B) Ethyl α-(3,5-di-t-butyl-4-hydroxyphenyl)isobutyrate.—To 200 parts by volume of dry t-butyl alcohol in a suitable flask fitted with mechanical stirrer, inert gas inlet, thermometer, condenser and dropping funnel is added 22.4 parts of potassium t-butoxide, 41.2 parts of 2,6-di-t-butylphenol and 50 parts by volume of triethylene glycol dimethyl ether. The dark green solution is stirred and a solution of an equimolar portion of ethyl-α-bromo-α-methylpropionate in 50 parts of t-butyl alcohol is added dropwise over 20–60 minutes. After addition is complete, the reaction is refluxed for 1 hour, the solution then being neutral. The reaction mixture is poured into water and extracted with ether. The ethereal solution is washed with water and dried and the ether removed by distillation, the product being isolated by vacuum distillation. The corresponding methyl ester, which is alternatively named as methyl 3-(3,5-di-t-butyl-4-hydroxyphenyl)-2,2-dimethylpropionate, is similarly obtained from methyl α-bromo-α-methylpropionate.

In a similar fashion, utilizing ethyl α-bromopropionate, there is obtained ethyl 2-(3,5-di-t-butyl-4-hydroxyphenyl) propionate, M.P. 54–56° C.

7-(3-methyl - 5 - t-butyl - 4 - hydroxyphenyl)heptanoic acid.—To a cooled (−5° C.) solution of 103 parts of ethyl 6-chloroformyl hexanoate in 100 parts by volume of ethylene chloride is rapidly added with stirring 133 parts of granular anhydrous aluminum chloride. To this mixture is next added a solution of 88 parts of 2-methyl-6-t-butylphenol in 500 parts by volume of ethylene chloride. The reaction mixture is stirred at −5° C. for 5 hours and then allowed to slowly attain room temperature overnight. At the end of this time the material is poured over ice, rendered acidic with 6 N hydrochloric acid and extracted with ether. The combined extracts are successively washed with water, dilute aqueous sodium bicarbonate solution and saturated aqueous sodium chloride solution. After drying over sodium sulfate, the solvent is removed under reduced pressure to yield ethyl 6-(3-methyl-5-t-butyl-4-hydroxybenzoyl)hexanoate, which is saponified with excess potassium hydroxide in methanol. After acidification of the reaction mixture, the solid, comprising 6-(3-methyl-5-t-butyl-4-hydroxybenzoyl)hexanoic acid, is subjected to a Clemmenson reduction as modified by Martin [J.A.C.S. 58, 1438 (1936)] to yield 7-(3-methyl - 5 - t - butyl-4-hydroxyphenyl)heptanoic acid which is esterified with ethanol and p-toluenesulfonic acid to yield the corresponding ethyl ester.

In a modification of this Friedel-Crafts reaction, 2,6-dimethylphenol is treated with acrylonitrile in the presence of aluminum chloride to yield 3-(3,5-dimethyl-4-hydroxyphenyl)propionitrile. Upon hydrolysis of this and esterification of the resulting free acid with methanol and p-toluenesulfonic acid, there is obtained methyl 3-(3,5-dimethyl-4-hydroxyphenyl)propionate, M.P. 70–83° C.

The following examples set forth the manner and process of making typical embodiments of the invention without being a limitation thereof and include the best mode contemplated by the inventors for carrying out the invention.

Example 1.—1,2-propylene glycol bis-[3-(3,5-di-t-butyl-4-hydroxyphenyl)propionate]

A mixture consisting of 16.7 parts 3-(3,5-di-t-butyl-4-hydroxyphenyl)propionic acid, 1.90 parts propylene glycol, 2.5 parts p-toluene sulfonic acid monohydrate and 300 parts by volume of toluene is refluxed until a constant quantity of water has been collected in a Dean-Stark water trap.

After cooling, the mixture is diluted with 300 parts by volume of benzene and washed successively with the following: water, 0.5 N sodium hydroxide, water and saturated sodium chloride. After drying over sodium sulfate, the solvent is removed under reduced pressure to yield 1,2-propylene glycol bis-[3-(3,5-di-t-butyl - 4 - hydroxyphenyl)propionate] (13.1 parts). This material is further purified by chromatography over alumina. Elution with hexane produces a minor amount of yellow oil followed by the desired product which crystallizes spontaneously and demonstrates a melting point of 70° C.

Calc. for $C_{37}H_{56}O_6$ (percent): C, 74.45; H, 9.45; O, 16.08. Found (percent): C, 74.23; H, 9.72; O, 16.13.

By utilizing equivalent amounts of 1,6-hexane diol in place of propylene glycol and 3-(3-methyl-4-hydroxy-5-t-butylphenyl)propionic acid in place of 3-(3,5-di-t-butyl-4-hydroxyphenyl)propionic acid, there is obtained 1,6-hexane diol bis-[3-(3-methyl-4-hydroxy-5-t-butylphenyl)propionate], M.P. 105–108° C.

Similarly the use of 3-(3,5-dimethyl-4-hydroxyphenyl)-propionic acid with 1,6-hexanediol yields 1,6-hexanediol bis[3-(3,5-dimethyl-4-hydroxyphenyl)propionate] as a syrup, anal., C calc. 71.46, found 71.41; H calc. 8.14, found 8.01.

Utilization of 3,5-di-t-butyl-4-hydroxyphenylacetic acid with ethylene glycol similarly yields ethylene glycol bis (3,5 - di - t - butyl - 4 - hydroxyphenylacetate), M.P. 112–115° C.

Example 2.—Ethylene glycol bis-[3-(3,5-di-t-butyl-4-hydroxyphenyl)-propionate]

A mixture consisting of 13.9 parts 3-(3,5-di-t-butyl-4-hydroxyphenyl)propionic acid, 1.24 parts ethylene glycol, 1.0 part p-toluene sulfonic acid monohydrate and 300 parts by volume of benzene is refluxed until a constant amount of water has been separated by azeotropic distillation.

After cooling, the solution is diluted with 100 parts by volume of benzene and successively washed with the following: water, 0.33 N sodium hydroxide, 0.5 N sodium hydroxide, 5% hydrochloric acid, water and finally with saturated aqueous sodium chloride solution. After drying over sodium sulfate, benzene is evaporated to yield 8.7 parts of ethylene glycol bis[3-(3,5-di-t-butyl-4-hydroxyphenyl)propionate] which is crystallized from 95% ethanol, M.P. 146–147°.

Example 3.—Neopentylglycol bis-[3-(3,5-di-t-butyl-4-hydroxyphenyl)propionate]

Methyl 3-(3,5-di-t-butyl-4-hydroxyphenyl)propionate (21.1 parts), 3.12 parts neopentylglycol and 0.378 parts of sodium methoxide are heated under nitrogen at 130° for 1½ hours. The methanol thus formed is collected in Dry Ice acetone cooled trap. After the theoretical amount of methanol is collected, the reaction mixture is heated at 150°/0.05 mm. for 3 hours. At the end of this time, the material is dissolved in hexane and filtered. The filtrate is then concentrated and recrystallized from 95% ethanol and thoroughly dried to yield neopentylglycol bis-[3-(3,5-di-t-butyl-4-hydroxyphenyl)propionate], M.P. 81–82°.

In a similar fashion, the following diols are substituted in equivalent amounts for neopentylglycol.

(a) 2-methyl-1,4-pentanediol
(b) 1,8-octanediol
(c) 2,4-dimethyl-2,4-pentanediol
(d) 1,9-nonanediol
(e) 1,5-pentanediol
(f) 1,12-dodecanediol
(g) 1,18-octadecanediol There are thus respectively obtained (a) 2-methyl-1,4-pentanediol bis[3-(3,5-di-t-butyl-4-hydroxyphenyl)propionate], M.P. 108–113° C. and 125–130° C., mixture of D. L. and racemic forms.
(b) 1,8-octanediol bis[3-(3,5-di-t-butyl - 4 - hydroxyphenyl)-propionate], M.P. 117–119° C.
(c) 2,4-dimethyl - 2,4 - pentanediol bis[3-(3,5-di-t-butyl-4-hydroxyphenyl)propionate], M.P. 144–146° C.
(d) 1,9-nonanediol bis[3-(3,5-di-t-butyl - 4 - hydroxyphenyl)propionate], M.P. 48–51° C.
(e) 1,5-pentanediol bis[3-(3,5-di-t-butyl - 4 - hydroxyphenyl)propionate], M.P. 88–91° C.
(f) 1,12-dodecanediol bis[3-(3,5-di-t-butyl - 4 - hydroxyphenyl)propionate], M.P. 65–69° C.
(g) 1,18-octadecanediol bis[3-(3,5-di-t-butyl - 4 - hydroxyphenyl)propionate].

Example 4.—Ethylene glycol bis-(3,5-di-t-butyl-4-hydroxyphenylacetate

A mixture consisting of 13.2 parts of 3,5-di-t-butyl-4-hydroxyphenylacetic acid, 1.24 parts of ethylene glycol, 1.7 parts of p-toluene sulfonic acid monohydrate and 330 parts by volume of benzene are treated according to the procedure of Example 1. The washed and dried benzene solution obtained from the reaction mixture is evaporated to yield 9.3 parts of ethylene glycol bis(3,5-di-t-butyl-4-hydroxyphenylacetate) which is further purified by recrystallization, M.P. 116–117°.

Example 5.—1,12-octadecanediol bis[3-(3,5-di-t-butyl-4-hydroxyphenyl)propionate]

To a mixture of 7.16 parts of 1,12-octadecanediol and 90 parts by volume of pyridine at a temperature of from 5 to 10° C. are added over a 1½ hour period 16.30 parts of 3-(3,5-di-t-butyl-4-hydroxyphenyl)-propionyl chloride. The mixture is then stirred at room temperature for 16 hours and at 50° C. for one hour and then poured into a mixture of 100 parts by vouume of 6 N hydrochloric acid and 800 parts of water. This mixture is extracted five times with 200 parts by volume of diethyl ether and the combined extracts washed three times with dilute hydrochloric acid, five times with water and twice with saturated sodium chloride solution. After drying over sodium sulfate, the solution is concentrated under reduced pressure and the residue chromatographed on alumina, eluting with heptane to yield the product.

*Analysis.*—Calcd. (percent): C, 77.37; H, 10.74. Found (percent): C, 77.27; H, 10.85.

In a similar fashion but utilizing 5.4 parts of 3-(3,5-di-t-butyl-4-hydroxyphenyl)-2,2-dimethylpropionyl chloride and 0.381 part of pentaerythritol and reacting these in a solvent mixture of 25 parts by volume of pyridine and 6 parts by volume of benzene at 45 to 50° C. for 17 hours, there is obtained pentaerythritol tetrakis-[3-(3,5-di-t-butyl-4-hydroxyphenyl)-2,2-dimethylpropionate].

*Analysis.*—Calcd. (percent): C, 75.47; H, 9.69. Found (percent): C, 74.78; H, 9.37.

By utilizing 0.191 part of pentaerythritol in 25 parts by volume of pyridine and 2.27 parts of 3-(3,5-di-t-butyl-4-hydroxyphenyl)-3,3-dimethylpropionyl chloride, the reaction being conducted by stirring at room temperature for 20 hours and at 50° C. for 37 hours, there is obtained pentaerythritol tetrakis [3-(3,5-di-t-butyl - 4 - hydroxyphenyl)-3,3-dimethylpropionate], M.P. 166–169° C., from heptane.

Analogously prepared from 0.54 parts of pentaerythritol and 6.84 parts of 3-(3,5-di-t-butyl-4-hydroxyphenyl)-2-methylpropionyl chloride, in a solvent mixture of 50 parts by volume of pyridine and 2 parts by volume of chloroform, is pentaerythritol tetrakis[3-(3,5-di-t-butyl-4-hydroxyphenyl)-2-methylpropionate], M.P. 150–154° C.

Example 6.—Pentaerythritol tetrakis [3-(3,5-di-t-butyl-4-hydroxyphenyl)propionate]

Pentaerythritol (6.8 parts) and lithium hydride (0.0885 part) are added to a reaction vessel equipped with an agitator, Dean-Stark trap and nitrogen inlet. The mixture is heated until the contents are molten (about 220° C.) and then cooled below 50° C. Methyl 3-(3,5-di-t-butyl-4 - hydroxyphenyl)propionate (64.5 parts) is then added and the reaction mixture heated at 185–190° C. for 13 hours with stirring. During this time, nitrogen is continuously introduced to provide an inert atmosphere and remove the generated methanol. The reaction mixture is then cooled and 500 parts by volume of benzene are then aded. The mixture is neutralized with glacial acetic acid and heated until a nearly complete solution is realized. After clarification and filtration, the reaction mixture is heated under reduced pressure to remove the solvent, cooled, then treated wtih 400 parts by volume of hexane and filtered. Chromatography over neutral alumina with elution with hexane produces an initial yellow impurity followed by the desired product which is freed of solvent by evaporation. The material, alternatively named tetrakis-[methylene 3-(3,5-di-t-butyl-4-hydroxyphenyl)-propionyloxy]methane, is a clear amber glass which softens at 50–60° C.

Calc. for $C_{73}H_{108}O_{12}$ (percent): C, 74.45; H, 9.24. Found (percent): C, 74.62; H, 9.33.

Alternatively this compound is prepared by slurrying 6.8 parts of pentaerythritol with 50 parts by volume of dimethylsulfoxide and adding 0.177 part of lithium hydride, followed by 64.5 parts of methyl 3-(3,5-di-t-butyl-4-hydroxyphenyl)propionate. The reaction mixture is heated at 85–90° C. under 15–20 mm. with stirring until no more methanol is evolved. The solvent is then removed under diminished pressure and the cooled residue taken up in 300 parts by volume of benzene. Glacial acetic acid is added to neutralize the mixture, which is then filtered to remove a small quantity of insoluble material. The filtrate is washed with water until neutral, then dried over sodium sulfate, filtered and stripped of solvent. The residue is freed of unreacted starting ester by distillation, 120–140° C./0.1 mm. The residue thus comprises the product. Upon recrystallization from isopropanol or n-hexane, the M.P. is 123–125° C.

In a similar fashion the following compounds are obtained from the appropriate polyols and methyl esters:

(a) 1,6-hexanediol bis[3-(3,5-di-t-butyl-4-hydroxyphenyl)propionate], M.P. 103–106° C.
(b) 1,1,1-trimethylolethane tris[3-(3,5-di-t-butyl-4-hydroxyphenyl)propionate], M.P. 106–108° C.
(c) 1,3-propanediol bis[3-3,5-di-t-butyl-4-hydroxyphenyl)propionate], M.P. 71–73° C.
(d) pentaerythritol tetrakis [3-(3-isopropyl-4-hydroxy-5-t-butylphenyl)propionate]
(e) pentaerythritol tetrakis {3-[3,5-di-(2-octyl)-4-hydroxyphenyl]propionate}
(f) pentaerythritol tetrakis [3-(3-ethyl-4-hydroxy-5-t-amylphenyl)propionate]
(g) pentaerythritol tetrakis [7-(3-methyl-4-hydroxy-5-t-butylphenyl)heptanoate]
(h) 1,4-butanediol bis[3-(3-,5-di-t-butyl-4-hydroxyphenyl)propionate], M.P. 82–84° C.
(i) 1,1,1-trimethylolethane bis[3,5-di-t-butyl-4-hydroxyphenylacetate], M.P. 102–104° C.
(j) ethylene glycol bis[3-(3-t-butyl-4-hydroxyphenyl)propionate]

Example 7.—1,1,1-trimethylolpropane tri-[3-(3,5-di-t-butyl-4-hydroxyphenyl)propionate]

To a reaction vessel as described in Example 6 are added 585 parts of methyl 3-(3,5-di-t-butyl-4-hydroxyphenyl)propionate, 67.1 parts of 1,1,1-trimethylolpropane and 1.33 parts of lithium hydride. The reactants are heated at 125–150° C. for 1½ hours at atmospheric pressure under nitrogen and then for an additional 4 hours at 110–120° C. at 0.2 to 0.5 mm. One thousand parts by volume of hexane are then added after cooling and the mixture then warmed with stirring and filtered. The filtrate is treated with 15 parts by volume of glacial acetic acid with stirring, followed by an excess of sodium carbonate with stirring. After refiltering, the filtrate is freed of solvent and volatile impurities by slowly heating to 152°/0.22 mm. The glassy residue constitutes the product, which is alternatively named as n-propyl 1,1,1-tris[methylene-3-(3,5-di-t-butyl-4 - hydroxyphenyl)propionate] and softens between 55–70° C.

Calc. for $C_{57}H_{86}O_9$ (percent): C, 74.80; H, 9.47. Found (percent): C, 74.45; H, 9.25.

Similarly prepared are:

(a) glycerine tris[3,5 - di - t - butyl - 4 - hydroxyphenyl)propionate], a glass (calc. (percent): C, 74.27; H, 9.23; found (percent): C, 74.16; H, 9.15).
(b) 1,1,1 - trimethylolbutane tris]3 - (3,5-di-t-butyl-4-hydroxyphenyl)propionate], a glass (calc. (percent): C, 74.96; H, 9.24; found (percent): C, 75.06; H, 9.67).
(c) pentaerythritol tetrakis[3-(3,5-diisopropyl-4-hydroxyphenylpropionate], a glass calc. (percent): C, 73.28; H, 8.70; found (percent): C, 73.41; H, 8.74).
(d) glycerine tris(3,5 - di - t - butyl - 4 - hydroxyphenylacetate), a glass (calc. (percent): C, 73.69; H, 8.97; found (percent): C, 73.62; H, 8.73).
(e) pentaerythritol tetrakis[3 - (3,5-di-t-octyl-4-hydroxyphenyl)propionate.
(f) pentaerythritol tetrakis(3,5 - di - t - butyl-4-hydroxyphenylacetate), a syrup (calc. percent): C, 73.89; H, 8.98; found (percent): C, 74.01; H, 8.70).

Example 8.—Sorbitol hexakis[3-(3,5-di-t-butyl-4-hydroxyphenyl)propionate]

By employing 9.1 parts of sorbitol, 0.239 part of lithium hydride and 96.6 parts of methyl 3 - (3,5-di-t-butyl-4-hydroxyphenyl)propionate in 50 parts by volume of dimethyl sulfoxide in the alternative procedure of Example 6, there is obtained sorbitol hexakis[3-(3,5-di-t-butyl-4-hydroxyphenyl)propionate], which softens at 75° C. and melts at 90° C.

(Calc. (percent): C, 74.36; H, 9.12; found (percent): C, 74.66; H, 9.20).

Example 9.—1,2,3-butanetriol tris-[3-(3,5-di-t-butyl-4-hydroxyphenyl)propionate]

The compound of this example is obtained according to the alternative procedure of Example 6 employing 10.6 parts of 1,2,3-butanetriol, 0.239 part of lithium hydride and 97.1 parts of methyl 3-(3,5-di-t-butyl-4-hydroxyphenyl)-propionate in 50 parts by volume of dimethyl sulfoxide.

Example 10.—Pentaerythritol tetrakis[3-(2-methyl-4-hydroxy-5-t-butylphenyl)propionate]

An equivalent amount of methyl 3-(2-methyl-4-hydroxy-5-t-butylphenyl)propionate is substituted for methyl 3-(3,5-di-t-butyl-4-hydroxyphenyl)propionate in the procedure of Example 6 to yield the above product as a hard colorless glass, softening at 80° C.

*Analysis.*—Calc. (percent): C, 72.58; H, 8.38. Found (percent): C. 72.45; H, 8.31.

Example 11

By utilizing a 30:70 mixture of the isomeric 2,4,4-trimethyl-1,6-hexanediol and 2,2,4-trimethyl-1,6-hexanediol in the procedure of Example 7 in place of 1,1,1-trimethylolpropane, there is obtained a 30:70 mixture of 2,4,4-trimethyl-1,6-hexanediol bis[3 - (3,5-di-t-butyl-4-hydroxyphenyl)propionate] and 2,2,4 - trimethyl-1,6-hexanediol bis[3-(3,5-di-t-butyl - 4 - hydroxyphenyl)propionate] as a syrup.

What is claimed is:

1. A compound of the formula:

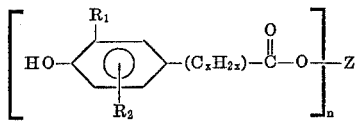

wherein $R^1$ is methyl, ethyl or an α-branched alkyl group of from 3 to 10 carbon atoms, $R^2$ is hydrogen, methyl, ethyl or an α-branched alkyl group of from 3 to 10 carbon atoms;

$x$ has a value of from 1 to 6;

$n$ has a value of from 2 to 6

Z is an aliphatic hydrocarbon of the formula:

$$C_yH_{2y+2-n}$$

in which $y$ has a value of from 2 to 18 when $n$ is 2 and a value of from 3 to 6 when $n$ is greater than 2, the value of $y$ in all cases being equal to or greater than that of $n$.

2. A compound according to claim 1 wherein $n$ is 2 and Z is a divalent aliphatic hydrocarbon of the formula $$-C_yH_{2y}-$$

in which $y$ has a value of from 2 to 18.

3. A compound according to claim 2 characterized by the formula:

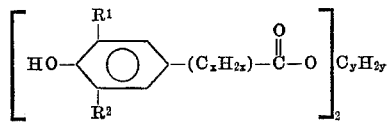

wherein each of $R^1$ and $R^2$ is methyl, ethyl or an α-branched alkyl group of from 3 to 6 carbon atoms.

4. A compound according to claim 3 wherein each of $R^1$ and $R^2$ is tertiary butyl.

5. A compound according to claim 4 which is a 3-(3,5-di-t-butyl-4-hydroxyphenyl)propionic acid diester of a diol selected from the group consisting of ethylene glycol; propylene glycol; 1,3-propanediol; 1,4-butanediol; 1,5-pentanediol; neopentyl glycol; 1,6-hexanediol; 2-methyl-1,4-pentanediol; 2,2,4-trimethyl-1,3-pentanediol; 2,4-dimethyl-2,4-pentanediol; 2,4,4 - trimethyl-1,6-hexanediol; 1,8-octanediol; 1,9-nonananediol; 1,10-decanediol; 1,2-dodecanediol; 1,12-octadecanediol and 1,18-octadecanediol.

6. The diester according to claim 5 which is ethylene glycol bis[3-(3,5-di-t-butyl-4-hydroxyphenyl)-propionate].

7. The diester according to claim 5 which is 1,2-propylene glycol bis-[3-(3,5-di-t-butyl-4-hydroxyphenyl)propionate].

8. The diester according to claim 5 which is neopentylglycol bis-[3,(3,5-di-t-butyl-4-hydroxyphenyl)propionate].

9. The diester according to claim 5 which is 1,6-hexanediol bis-[3,5-di-t-butyl-4-hydroxyphenyl)propionate].

10. The diester according to claim 5 which is 1,9-nonanediol bis-[3 - (3,5-di-t-butyl-4-hydroxyphenyl)propionate].

11. A compound according to claim 1 wherein $n$ has a value of from 3 to 6 and Z is an aliphatic hydrocarbon of the formula:

$$C_yH_{2y+2-n}$$

in which $y$ has a value of from 3 to 6, the value of $y$ being equal to or greater than the value of $n$.

12. A compound according to claim 11 characterized by the formula:

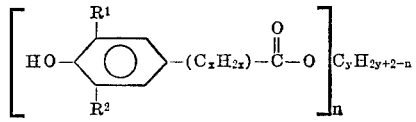

wherein each of $R^1$ and $R^2$ is methyl, ethyl or an α-branched alkyl group of from 3 to 6 carbon atoms.

13. A compound according to claim 11 wherein each of $R^1$ and $R^2$ is tertiary butyl.

14. A compound according to claim 13 which is pentaerythritol tetrakis-[3-(3,5-di-t-butyl - 4 - hydroxyphenyl)propionate].

15. A compound according to claim 13 which is 1,1,1-trimethylolethane tris[3-(3,5-di-t-butyl-4-hydroxyphenyl)propionate].

16. A compound according to claim 13 which is 1,1,1-trimethylolpropane tris[3-(3,5-di-t-butyl-4-hydroxyphenyl)propionate].

17. A compound according to claim 13 which is 1,1,1-trimethylolpropane tris[3-(3,5-di-t-butyl-4-hydroxyphenyl)propionate].

18. A compound according to claim 13 which is glycerine tris [3-(3,5-di-t-butyl-4-hydroxyphenyl)propionate].

19. A compound according to claim 13 which is sorbitol hexakis [3-(3,5-di-t-butyl-4-hydroxyphenyl)propionate].

20. A compound according to claim 12 which is pentaerythritol tetrakis [3-(3-methyl-4-hydroxy-5-t-butylphenyl)propionate].

21. A compound according to claim 12 which is pentaerythritol tetrakis [3-(3,5-dimethyl-4-hydroxyphenyl)propionate].

References Cited

UNITED STATES PATENTS

| | | | |
|---|---|---|---|
| 3,112,338 | 11/1963 | Smutny et al. | 260—473 R |
| 3,285,855 | 11/1966 | Dexter et al. | 260—473 R X |

LORRAINE A. WEINBERGER, Primary Examiner

J. F. TERAPANE, Assistant Examiner

U.S. Cl. X.R.

260—45.85, 389.5; 252—404; 99—163